(12) United States Patent
Ritmanich et al.

(10) Patent No.: US 11,368,493 B2
(45) Date of Patent: Jun. 21, 2022

(54) SYSTEM FOR AND METHOD OF DETECTING COMMUNICATION SECURITY IN BUILDING AUTOMATION AND CONTROL NETWORKS

(71) Applicant: Johnson Controls Technology Company, Auburn Hills, MI (US)

(72) Inventors: Kraig D. Ritmanich, Brookfield, WI (US); Brandon A. Sloat, New Berlin, WI (US); Japneet Singh, New Delhi (IN)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 96 days.

(21) Appl. No.: 17/061,860

(22) Filed: Oct. 2, 2020

(65) Prior Publication Data
US 2022/0109697 A1 Apr. 7, 2022

(51) Int. Cl.
*H04L 29/06* (2006.01)
*H04L 9/40* (2022.01)
*H04L 69/18* (2022.01)
*H04L 41/082* (2022.01)
*H04L 12/28* (2006.01)

(52) U.S. Cl.
CPC .......... *H04L 63/20* (2013.01); *H04L 12/2807* (2013.01); *H04L 41/082* (2013.01); *H04L 63/1433* (2013.01); *H04L 69/18* (2013.01)

(58) Field of Classification Search
CPC .............. H04L 63/20; H04L 12/403; H04L 12/2818; H04L 12/2825; H04L 63/104; G05B 19/042; G06F 30/18

USPC .......................................................... 726/26
See application file for complete search history.

(56) References Cited

U.S. PATENT DOCUMENTS

| 2,007,019 | A | * | 7/1935 | Aubreyl | F41G 1/04 42/111 |
| 6,438,612 | B1 | * | 8/2002 | Ylonen | H04L 63/0227 707/999.01 |
| 8,718,707 | B2 | * | 5/2014 | Crawford | G05D 23/1917 455/557 |
| 9,241,007 | B1 | * | 1/2016 | Witter | H04L 63/1433 |

(Continued)

FOREIGN PATENT DOCUMENTS

| EP | 3439235 B1 | * | 12/2019 | .............. H04L 12/12 |
| EP | 3308227 B1 | * | 3/2020 | ......... H04L 12/6418 |
| WO | WO-2017200664 A1 | * | 11/2017 | ......... H04L 12/2809 |

OTHER PUBLICATIONS

Merriam-Webster, "attribute", 2020 (Year: 2020).*

(Continued)

*Primary Examiner* — Ondrej C Vostal
(74) *Attorney, Agent, or Firm* — Foley & Lardner LLP

(57) ABSTRACT

A building system includes heating ventilation or air conditioning (HVAC) devices configured for communication on a building automation network and a communication engine. The communication engine is configured to provide a diagnostic attribute. The diagnostic attribute indicates communications with the HVAC devices as being according to a first communication protocol or at least one different communication protocol. Systems and methods may detect insecure communications and/or upgrade in secure communication protocols in wireless or wired networks, such as, BACnet systems and/or subsystems.

30 Claims, 8 Drawing Sheets

(56) References Cited

U.S. PATENT DOCUMENTS

| | | | | |
|---|---|---|---|---|
| 10,609,030 | B1* | 3/2020 | Newstadt | H04L 61/6022 |
| 10,983,785 | B1* | 4/2021 | Bryan | H04L 63/101 |
| 2005/0022183 | A1* | 1/2005 | Poisson | H04L 41/0253 |
| | | | | 718/1 |
| 2005/0034533 | A1* | 2/2005 | Wang | G01F 1/708 |
| | | | | 73/861.05 |
| 2006/0074952 | A1* | 4/2006 | Rothman | G06F 9/4451 |
| 2006/0274745 | A1* | 12/2006 | Wang | H04W 88/16 |
| | | | | 370/389 |
| 2007/0055760 | A1* | 3/2007 | McCoy | H04L 41/22 |
| | | | | 709/223 |
| 2008/0057931 | A1* | 3/2008 | Nass | H04L 12/2814 |
| | | | | 455/419 |
| 2009/0172807 | A1* | 7/2009 | Flowers | H04L 63/104 |
| | | | | 726/17 |
| 2010/0106787 | A1* | 4/2010 | Grohman | G05B 15/02 |
| | | | | 709/206 |
| 2010/0179696 | A1* | 7/2010 | Grohman | F24F 11/30 |
| | | | | 700/276 |
| 2012/0204241 | A1* | 8/2012 | Varsavsky Waisman-Diamond | H04W 12/0608 |
| | | | | 726/5 |
| 2012/0257757 | A1* | 10/2012 | Gessner | H04L 9/3263 |
| | | | | 380/282 |
| 2014/0045482 | A1* | 2/2014 | Bisson | G05B 19/042 |
| | | | | 455/420 |
| 2014/0200718 | A1* | 7/2014 | Tessier | G05D 23/1902 |
| | | | | 700/276 |
| 2015/0039752 | A1* | 2/2015 | Hague | H04L 12/403 |
| | | | | 709/224 |
| 2015/0154850 | A1* | 6/2015 | Fadell | G08B 29/185 |
| | | | | 340/501 |
| 2016/0061468 | A1* | 3/2016 | Alexander | F24F 11/38 |
| | | | | 700/276 |
| 2016/0209059 | A1* | 7/2016 | Castillo | H04L 12/2825 |
| 2016/0211985 | A1* | 7/2016 | Castillo | F24F 11/62 |
| 2016/0220285 | A1* | 8/2016 | Fortin | A61B 17/7071 |
| 2016/0267144 | A1* | 9/2016 | Manimaran | H04W 4/029 |
| 2016/0294446 | A1* | 10/2016 | Rumler | F24F 11/30 |
| 2017/0235585 | A1* | 8/2017 | Gupta | H04L 41/12 |
| | | | | 718/1 |
| 2017/0284691 | A1* | 10/2017 | Sinha | F24F 11/62 |
| 2017/0314797 | A1* | 11/2017 | Blair | F24F 11/38 |
| 2017/0343231 | A1* | 11/2017 | Rumler | H04L 67/125 |
| 2017/0366414 | A1* | 12/2017 | Hamilton | H04L 41/145 |
| 2018/0119972 | A1* | 5/2018 | Trikha | F24F 11/62 |
| 2018/0121190 | A1* | 5/2018 | Atchison | F24F 11/32 |
| 2018/0167229 | A1* | 6/2018 | Brun | G05B 13/02 |
| 2018/0314277 | A1* | 11/2018 | Moore | G05D 23/1917 |
| 2018/0328612 | A1* | 11/2018 | Sinha | G05D 23/1934 |
| 2018/0337941 | A1* | 11/2018 | Kraning | H04L 43/50 |
| 2018/0373234 | A1* | 12/2018 | Khalate | G05B 23/0221 |
| 2019/0020494 | A1* | 1/2019 | Roosli | H04L 12/2807 |
| 2019/0095644 | A1* | 3/2019 | Park | G05B 15/02 |
| 2019/0107304 | A1* | 4/2019 | Blair | G08B 21/187 |
| 2019/0155238 | A1* | 5/2019 | Srivastava | H04L 67/125 |
| 2019/0331358 | A1* | 10/2019 | Ritmanich | F24F 11/58 |
| 2020/0064002 | A1* | 2/2020 | Bogli | F24F 11/65 |
| 2020/0068371 | A1* | 2/2020 | Lowe | H04W 8/18 |
| 2020/0119982 | A1* | 4/2020 | Gottschalk | H04L 12/2816 |
| 2020/0127973 | A1* | 4/2020 | Akyol | H04L 63/0209 |
| 2020/0136847 | A1* | 4/2020 | Serwatowski | H04L 9/3297 |
| 2020/0177409 | A1* | 6/2020 | Galchenko | H04L 12/283 |
| 2020/0226326 | A1* | 7/2020 | Ros | H04L 67/2823 |
| 2020/0249646 | A1* | 8/2020 | Gupta | G05B 19/042 |
| 2020/0274389 | A1* | 8/2020 | Islam | H02J 3/008 |
| 2020/0313924 | A1* | 10/2020 | Park | H04L 12/2812 |
| 2020/0364341 | A1* | 11/2020 | Ochiai | G06F 9/44536 |
| 2021/0011443 | A1* | 1/2021 | Mcnamara | G05B 19/042 |
| 2022/0006854 | A1* | 1/2022 | Hulick, Jr. | H04L 67/10 |

OTHER PUBLICATIONS

Microsoft Computer Dictionary, "attribute", 5th edition, 2002 (Year: 2002).*

Bushby et al., "BACnet Today", "Significant New Features and Future Enhancements", "Alarm and Event Management" on p. 14, 2002 (Year: 2002).*

Esquivel-Vargas et al., "Automatic Deployment of Specification-based Intrusion Detection in the BACnet Protocol", Abstract, section 2 on p. 25, section 10 on p. 36, 2017 (Year: 2017).*

Peacock et al., "An Exploration of Some Security Issues Within the BACnet Protocol", section 3.3 on p. 256, 2018 (Year: 2018).*

Wikipedia, "BACnet", 2021 (Year: 2021).*

Hong, "Internet-Based Control and Monitoring system Using LonWorks FieldBus for HVAC Application", 2004 (Year: 2004).*

Koscher et al., "Experimental Security Analysis of a Modern Automobile", 2010 (Year: 2010).*

Kunifuji et al., "A Proposal of flexible railway signalling system utilizing autonomous decentralized technology", 2009 (Year: 2009).*

Mirfakhraie et al., "Applicable Protocol for Updating Firmware of Automotive HVAC Electronic Control Units (ECUs) Over the Air", 2018 (Year: 2018).*

Pan et al., "Context aware intrusion detection for building automation systems", 2017 (Year: 2017).*

Taasevigen, "Highlights and Lessons Learned from Army Re-tuning Pilot Demonstrations", 2019 (Year: 2019).*

Valentin et al., "Advanced Building Energy Management Systems, Optimize power consumption using IP Base Control Improved Power Grid Stability", 2012 (Year: 2012).*

Wei et al., "Research and Application of Intelligent Building System Integration Methods", 2009 (Year: 2009).*

\* cited by examiner

SYSTEM FOR AND METHOD OF DETECTING COMMUNICATION SECURITY IN BUILDING AUTOMATION AND CONTROL NETWORKS

BACKGROUND

The present disclosure relates generally to network security, such as, network security for a building system, such as, a building management system (BMS). Some embodiments of the present disclosure relate to upgrading servers and controllers on a wired or wireless building automation and control network (BACnet) and/or identifying non-secure points (e.g., controllers) on the BACnet.

A BMS is, in general, a system of devices configured to control, monitor, and manage equipment in and/or around a building or building area. The BMS can include, for example, a heating ventilation or air conditioning (HVAC) system, a security system, a lighting system, a fire alerting system, and any other system that is capable of managing building functions or devices, or any combination thereof. The systems and sub-systems of the BMS communicate via wired and wireless networks. Different network protocols associated with different equipment, systems and subsystems can pose security vulnerabilities. It may therefore be advantageous to provide systems and methods for improving network security in building systems and upgrading or migrating building systems to higher security protocols.

SUMMARY

One implementation relates to systems for and methods of detecting insecure communications and/or upgrading in secure communication protocols in wireless or wired networks, such as, BACnet systems and/or subsystems.

One implementation of the present disclosure is a building system. The building system includes a HVAC devices and a communication engine (e.g., a supervisory device). The communication engine is configured to provide a diagnostic attribute and configured to use a first communication protocol. The HVAC devices are configured for communication on a building automation network The diagnostic attribute indicates communications with the HVAC devices as being according to at least one different communication protocol from the first communication protocol.

In some embodiments, the communication engine is configured as a server including a processing circuit. The processing circuit includes a processor and memory. The memory stores instructions that, when executed by the processor, cause the processor to perform operations. The operations include identifying the HVAC devices served by the communication engine to be upgraded to the first communication protocol. The first communication protocol is a more secure protocol. The operations also include updating firmware of the HVAC devices served by the communication engine to be upgraded to the first communication protocol to the first communication protocol, and disabling communication using the at least one different protocol by the HVAC devices.

In some embodiments, the HVAC devices are field controllers and a tier 1 server is in communication with the communication engine via the first secure protocol. In some embodiments, the first secure protocol is a building automation and control network (BACnet) secure protocol and the different protocol is a BACnet/IP protocol. In some embodiments, the diagnostic attribute comprises an array of structures with each structure consisting of an IP address, a BACnet device object identifier, a BACnet service, and a time stamp.

In some embodiments, the communication engine includes a processing circuit that includes a processor and memory. The memory stores instructions that, when executed by the processor, cause the processor to perform operations. The operations include identifying the HVAC devices served by the communication engine to be upgraded to the first communication protocol, the first communication protocol being a secure protocol, updating firmware of the HVAC devices served by the communication engine to be upgraded to the first communication protocol to the first communication protocol, allowing communication using the at least one different protocol by the HVAC devices, and providing a list of the HVAC devices communicating using the at least one different protocol after updating the firmware.

In some embodiments, the communication engine includes a processing circuit that includes a processor and memory. The memory stores instructions that, when executed by the processor, cause the processor to perform operations. The operations include disabling communications by the engine using the different protocol if the communications between the HVAC devices and the engine do not use the at least one different protocol.

One implementation of the present disclosure is a method of detecting insecure communications via a building automation system network in a building system. The method includes identifying HVAC devices on the building automation system network to be upgraded to a first communication protocol from at least one different communication protocol. The first communication protocol is a more secure protocol than the at least one different communication. The method also includes updating firmware of the HVAC devices to be upgraded to the first communication protocol to the first communication protocol, determining HVAC devices that use the at least one different communication protocol, and disabling communication using the at least one different protocol by the HVAC devices that do not use the at least one different communication protocol.

In some embodiments, the method further includes providing a diagnostic attribute comprising an IP address, a BACnet device object identifier, a BACnet service, and a time stamp. In some embodiments, the method also includes using the diagnostic attribute to determine HVAC devices that use the at least one different communication protocol. In some embodiments, the method further includes providing a list of the HVAC devices communicating using the at least one different protocol after updating the firmware. In some embodiments, the method further includes disabling communications by a communication engine using the different protocol if the communications between the HVAC devices and the engine do not use the at least one different protocol after updating firmware of the HVAC devices served by the communication engine.

One implementation of the present disclosure is a communication engine for a building system including a plurality of heating ventilation or air conditioning (HVAC) devices configured for communication on at eat one building automation network. The communication engine includes a processor configured to communicate with the HVAC devices using a first communication protocol and provide a diagnostic attribute. The diagnostic attribute listing communications with the HVAC devices as being according to at least one different communication protocol from the first communication protocol.

In some embodiments, the communication engine includes a processing circuit that includes a processor and memory. The memory stores instructions that, when executed by the processor, cause the processor to perform operations. The operations include identifying the HVAC devices served by the communication engine to be upgraded to the first communication protocol, the first communication protocol being a secure protocol, and updating firmware of the HVAC devices served by the communication engine to be upgraded to the first communication protocol to the first communication protocol and disabling communication using the at least one different protocol by the HVAC devices.

In some embodiments, the processor is configured to disable communications by the communication engine using the different protocol if the communications between the HVAC devices and the communication engine do not use the at least one different protocol after updating firmware of the HVAC devices served by the communication engine.

BRIEF DESCRIPTION OF THE DRAWINGS

The above and other aspects and features of the present disclosure will become more apparent to those skilled in the art from the following detailed description of the example embodiments with reference to the accompanying drawings.

DETAILED DESCRIPTION

Referring generally to the Figures, some embodiments of a system for and method of enhancing or upgrading network security in a building is shown and described, according to various exemplary embodiments. In some embodiments, building equipment (e.g., for HVAC systems) communicates via at least one BACnet communication protocol. The BACnet communication protocols define several different datalinks to support a variety of physical media in some embodiments. For example, the BACnet/IP datalink uses User Datagram Protocol (UDP) on top of Internet Protocol (IP) version 4 (IPv4) and is one of the primary datalinks supported by existing BACnets. In some embodiments, systems and methods advantageously use BACnet Secure Connect (BACnet/SC) for secure communications over IPv4 using web sockets, Transmission Control Protocol (TCP)/IP and transport layer security (TLS). Unlike the connectionless BACnet/IP protocol, BACnet/SC establishes TCP connections between devices which eliminates the need to broadcast in some embodiments. In general, BACnet/SC can also adopt more modern network systems, can more easily integrate into existing networks, and eliminates the need of static IP addresses, thereby reducing the burden for information technology (IT) services and decreasing lease cost to users. BACnet/SC also can eliminate the use of BACnet/IP Broadcast Management Device (BBMD) and their configuration.

In some embodiments, systems and methods advantageously achieve security and IT improvements with BACnet/SC and yet operate with existing building equipment and existing network protocols. The systems and methods can advantageously be used to upgrade lower security protocol devices (e.g., BACnet/IP devices) to a protocol with a higher level of security (e.g., from BACnet/IP to BACnet/SC). The systems and methods also accommodate devices in a building that cannot be upgraded or for which it is will not be undesirable to upgrade to the higher security protocol (e.g., legacy devices) in some embodiments. For example, it may be undesirable to upgrade devices because a particular vendor might not support BACnet/SC or there may be a desire to leave some devices as-is (i.e. retaining firmware that only supports BACnet/IP) (e.g., critical controls for a sensitive environment where maintaining control of the system is key).

In some embodiments, the systems and methods allow understanding of where the insecure vulnerabilities exist within the network. In some embodiments, the systems and methods use engines that serve as the coordinators of connections and interface with controllers from a wide variety of vendors over several different protocols and upgrade the controllers where appropriate. In some embodiments, the engine is an HVAC device that has some characteristics of a gateway, router, and/or operator workstation. Various other benefits of the present disclosure are described in reference to the FIGURES below.

Figure 1:
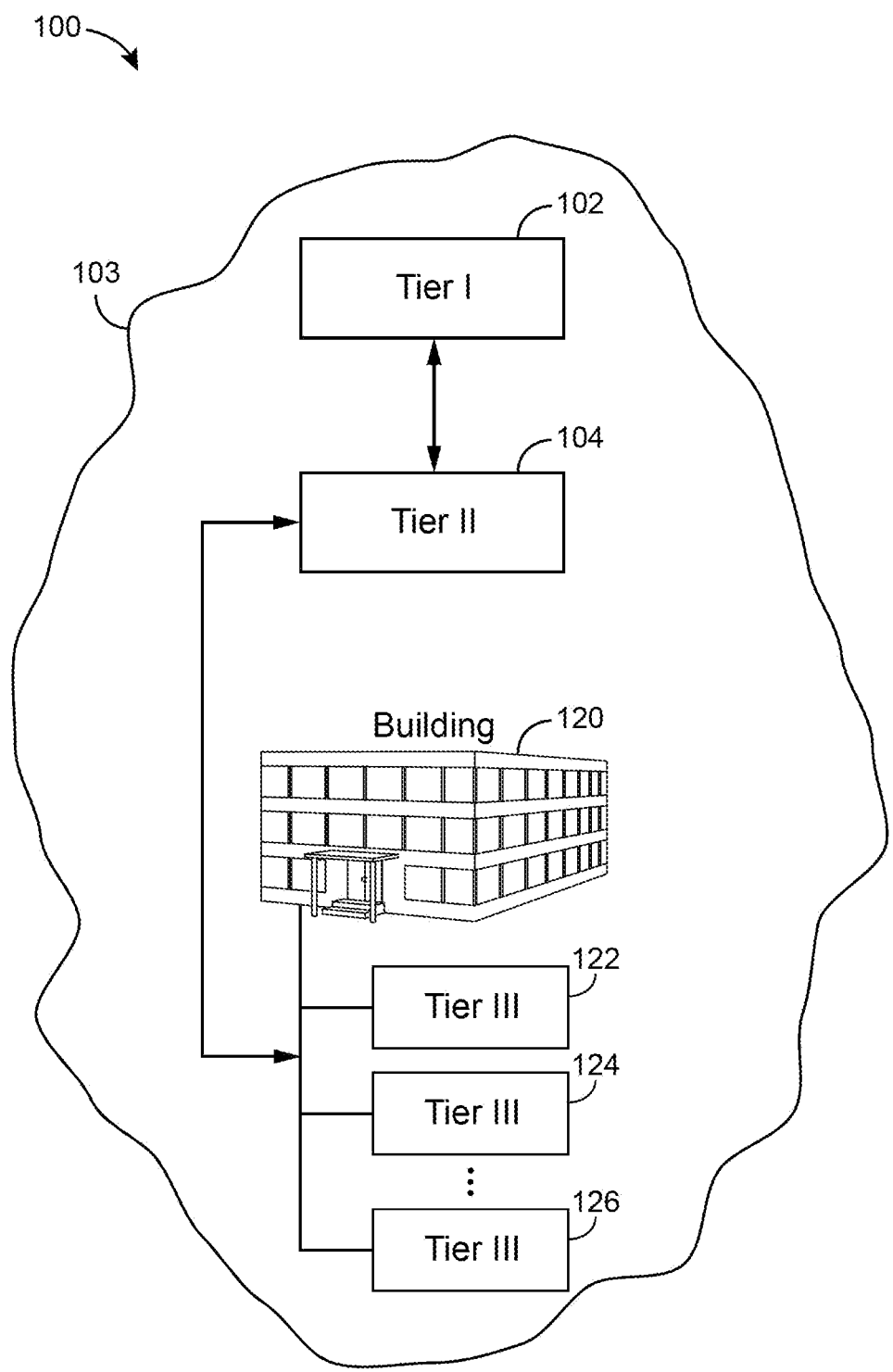
FIG. 1 is a general block diagram of a building environment with HVAC devices communicating via a network, according to an exemplary embodiment.

Hereinafter, certain exemplary embodiments will be described in more detail with reference to the accompanying drawings. FIG. 1 is a block diagram of a building environment 100 including a building 120 associated with a network 103. Network 103 is one or more wired networks, one or more wireless networks, or combinations thereof. The wireless and wired networks can be BACnet networks, Wi-Fi networks, Ethernets, etc., operating according to various protocols according to some exemplary embodiments.

In some embodiments, a tier 1 device 102, a tier 2 device 104, and tier 3 devices 122, 124, and 126 communicate via the network 103. In some embodiments, the tier 1 device 102, tier 2 device 104 and some of the tier 3 devices 122, 124, and 126 (e.g., building equipment) communicate using a higher security protocol than some other of the tier III tier 3 devices 122, 124, and 126. The higher security protocol can be BACnet/SC and the lower security protocol can be BACnet/IP in some embodiments. The tiers for the tier 1 device 102, the tier 2 device 104, and the tier 3 devices 122, 124, and 126 can be based upon control and communication responsibilities of that device. The network 103 can include any number of each of tier I device 102, a tier 2 device 104, and tier 3 devices 122, 124, and 126. Tier I device 102 and the tier 2 device 104 can each be a server, a router, a gateway, or combinations thereof.

Tier I device 102 can be configured to collect data from a variety of different data sources. Tier I device 102 can collect data from building 120 as well as additional buildings. Tier I device 102 can collect data from a variety of external systems or services. For example, tier I device 102 can receive weather data from a weather service, news data from a news service, documents and other document-related data from a document service, and media (e.g., video, images, audio, social media, etc.) from a media service (e.g., 3$^{rd}$ party services).

Building 120 can be a campus, a school, a hospital, a factory, an office building, and/or the like, combinations thereof and portions thereof. However the present disclosure is not limited to the number or types of building 120. For example, in some embodiments, tier I device 102 may be configured to collect data from one or more buildings, and the one or more buildings may be the same type of building, or may include one or more different types of buildings than that shown in FIG. 1. HVAC control equipment can be classified into tiers based on the control and communication responsibilities of that device. Tier 1 device 102 is a server-level platform that serve as the primary interface for monitoring large systems, is able to display alarms, events, trends and reports and can also communicate over Ethernet with the tier 2 device 104 in some embodiments.

Tier 2 device 104 can have many of the same features as Tier 1 device 102 and can be more cost effective and resource constrained than tier 1 device 102. Tier 2 device has a user interface (UI) and communicate over Ethernet or other networks with tier 1 device 102, or tier 3 devices 122, 124, and 126. Tier 2 device 104 has one or more serial communication ports to transfer data via BACnet MS/TP, N2, LON, etc. in some embodiments. Tier 2 device 104 is configured as a communication engine to facilitate data sharing within an HVAC system and are an integral component for integrating 3$^{rd}$ party devices in the HVAC system in some embodiments.

Tier 3 devices 122, 124, and 126 communicates with tier 2 device 104 wirelessly or wired via Ethernet (e.g. BACnet/IP) or using serial communication (e.g. BACnet MS/TP). Tier 3 devices 122, 124, and 126 devices have a minimal UI with very limited capability consisting of either LEDs and/or a small liquid crystal displays (LCDs) in some embodiments. Tier 3 devices 122, 124, and 126 can include controllers, communicating sensors, actuators, thermostats, security equipment, fire equipment, etc.

Tier I device 102 can be configured to collect data from a variety of Tier 3 devices 122, 124, and 126, either directly (e.g., directly via network 103) or indirectly (e.g., via systems or applications in the building 120). In some embodiments, devices 122-126 are HVAC controllers.

In some embodiments, devices 122-126 are internet of things (IoT) devices. Tier 3 devices 122, 124, and 126 can include IoT devices of a variety of physical devices, sensors, actuators, electronics, vehicles, home appliances, and/or other items having network connectivity which enable IoT devices to communicate with tier 1 device 102 via the tier 2 device 104. For example, IoT devices can include smart home hub devices, smart house devices, doorbell cameras, air quality sensors, smart switches, smart lights, smart appliances, garage door openers, smoke detectors, heart monitoring implants, biochip transponders, cameras streaming live feeds, automobiles with built-in sensors, DNA analysis devices, field operation devices, tracking devices for people/vehicles/equipment, networked sensors, wireless sensors, wearable sensors, environmental sensors, RFID gateways and readers, IoT gateway devices, robots and other robotic devices, GPS devices, smart watches, virtual/augmented reality devices, and/or other networked or networkable devices. While the devices described herein are generally referred to as IoT devices, it should be understood that, in various embodiments, the devices referenced in the present disclosure could be any type of devices capable of communicating data over an electronic network.

In some embodiments, IoT devices may include sensors or sensor systems. For example, IoT devices may include acoustic sensors, sound sensors, vibration sensors, automotive or transportation sensors, chemical sensors, electric current sensors, electric voltage sensors, magnetic sensors, radio sensors, environment sensors, weather sensors, moisture sensors, humidity sensors, flow sensors, fluid velocity sensors, ionizing radiation sensors, subatomic particle sensors, navigation instruments, position sensors, angle sensors, displacement sensors, distance sensors, speed sensors, acceleration sensors, optical sensors, light sensors, imaging devices, photon sensors, pressure sensors, force sensors, density sensors, level sensors, thermal sensors, heat sensors, temperature sensors, proximity sensors, presence sensors, and/or any other type of sensors or sensing systems.

Examples of acoustic, sound, or vibration sensors include geophones, hydrophones, lace sensors, guitar pickups, microphones, and seismometers. Examples of automotive or transportation sensors include air flow meters, air-fuel ratio (AFR) meters, blind spot monitors, crankshaft position sensors, defect detectors, engine coolant temperature sensors, Hall effect sensors, knock sensors, map sensors, mass flow sensors, oxygen sensors, parking sensors, radar guns, speedometers, speed sensors, throttle position sensors, tire-pressure monitoring sensors, torque sensors, transmission fluid temperature sensors, turbine speed sensors, variable reluctance sensors, vehicle speed sensors, water sensors, and wheel speed sensors.

Examples of chemical sensors include breathalyzers, carbon dioxide sensors, carbon monoxide detectors, catalytic bead sensors, chemical field-effect transistors, chemiresistors, electrochemical gas sensors, electronic noses, electrolyte-insulator-semiconductor sensors, fluorescent chloride sensors, holographic sensors, hydrocarbon dew point analyzers, hydrogen sensors, hydrogen sulfide sensors, infrared point sensors, ion-selective electrodes, nondispersive infrared sensors, microwave chemistry sensors, nitrogen oxide sensors, olfactometers, optodes, oxygen sensors, ozone monitors, pellistors, pH glass electrodes, potentiometric sensors, redox electrodes, smoke detectors, and zinc oxide nanorod sensors.

Examples of electromagnetic sensors include current sensors, Daly detectors, electroscopes, electron multipliers, Faraday cups, galvanometers, Hall effect sensors, Hall probes, magnetic anomaly detectors, magnetometers, magnetoresistances, mems magnetic field sensors, metal detectors, planar hall sensors, radio direction finders, and voltage detectors.

Examples of environmental sensors include actinometers, air pollution sensors, bedwetting alarms, ceilometers, dew warnings, electrochemical gas sensors, fish counters, frequency domain sensors, gas detectors, hook gauge evaporimeters, humistors, hygrometers, leaf sensors, lysimeters, pyranometers, pyrgeometers, psychrometers, rain gauges, rain sensors, seismometers, SNOTEL sensors, snow gauges, soil moisture sensors, stream gauges, and tide gauges. Examples of flow and fluid velocity sensors include air flow meters, anemometers, flow sensors, gas meter, mass flow sensors, and water meters.

Examples of radiation and particle sensors include cloud chambers, Geiger counters, Geiger-Muller tubes, ionisation chambers, neutron detections, proportional counters, scintillation counters, semiconductor detectors, and thermoluminescent dosimeters. Examples of navigation instruments include air speed indicators, altimeters, attitude indicators, depth gauges, fluxgate compasses, gyroscopes, inertial navigation systems, inertial reference nits, magnetic compasses, MHD sensors, ring laser gyroscopes, turn coordinators, tialinx sensors, variometers, vibrating structure gyroscopes, and yaw rate sensors.

Examples of position, angle, displacement, distance, speed, and acceleration sensors include auxanometers, capacitive displacement sensors, capacitive sensing devices, flex sensors, free fall sensors, gravimeters, gyroscopic sensors, impact sensors, inclinometers, integrated circuit piezoelectric sensors, laser rangefinders, laser surface velocimeters, Light Detection And Ranging (LIDAR) sensors, linear encoders, linear variable differential transformers (LVDT), liquid capacitive inclinometers odometers, photoelectric sensors, piezoelectric accelerometers, position sensors, position sensitive devices, angular rate sensors, rotary encoders, rotary variable differential transformers, selsyns, shock detectors, shock data loggers, tilt sensors, tachometers, ultrasonic thickness gauges, variable reluctance sensors, and velocity receivers.

Examples of optical, light, imaging, and photon sensors include charge-coupled devices, complementary metal-oxide-semiconductor (CMOS) sensors, colorimeters, contact image sensors, electro-optical sensors, flame detectors, infra-red sensors, kinetic inductance detectors, led as light sensors, light-addressable potentiometric sensors, Nichols radiometers, fiber optic sensors, optical position sensors, thermopile laser sensors, photodetectors, photodiodes, photomultiplier tubes, phototransistors, photoelectric sensors, photoionization detectors, photomultipliers, photoresistors, photoswitches, phototubes, scintillometers, Shack-Hartmann sensors, single-photon avalanche diodes, superconducting nanowire single-photon detectors, transition edge sensors, visible light photon counters, and wavefront sensors.

Examples of pressure sensors include barographs, barometers, boost gauges, bourdon gauges, hot filament ionization gauges, ionization gauges, McLeod gauges, oscillating u-tubes, permanent downhole gauges, piezometers, pirani gauges, pressure sensors, pressure gauges, tactile sensors, and time pressure gauges. Examples of force, density, and level sensors include bhangmeters, hydrometers, force gauge and force sensors, level sensors, load cells, magnetic level gauges, nuclear density gauges, piezocapacitive pressure sensors, piezoelectric sensors, strain gauges, torque sensors, and viscometers.

Examples of thermal, heat, and temperature sensors include bolometers, bimetallic strips, calorimeters, exhaust gas temperature gauges, flame detections, Gardon gauges, Golay cells, heat flux sensors, infrared thermometers, microbolometers, microwave radiometers, net radiometers, quartz thermometers, resistance thermometers, silicon bandgap temperature sensors, special sensor microwave/imagers, temperature gauges, thermistors, thermocouples, thermometers, and pyrometers. Examples of proximity and presence sensors include alarm sensors, Doppler radars, motion detectors, occupancy sensors, proximity sensors, passive infrared sensors, reed switches, stud finders, triangulation sensors, touch switches, and wired gloves.

In some embodiments, different sensors send measurements or other data to tier 1 device 102 using a variety of different communications protocols or data formats. Tier 2 device 104 can be configured to ingest sensor data received in any protocol or data format and translate the inbound sensor data into a common data format.

Building HVAC Systems and Building Management Systems

Figure 2:
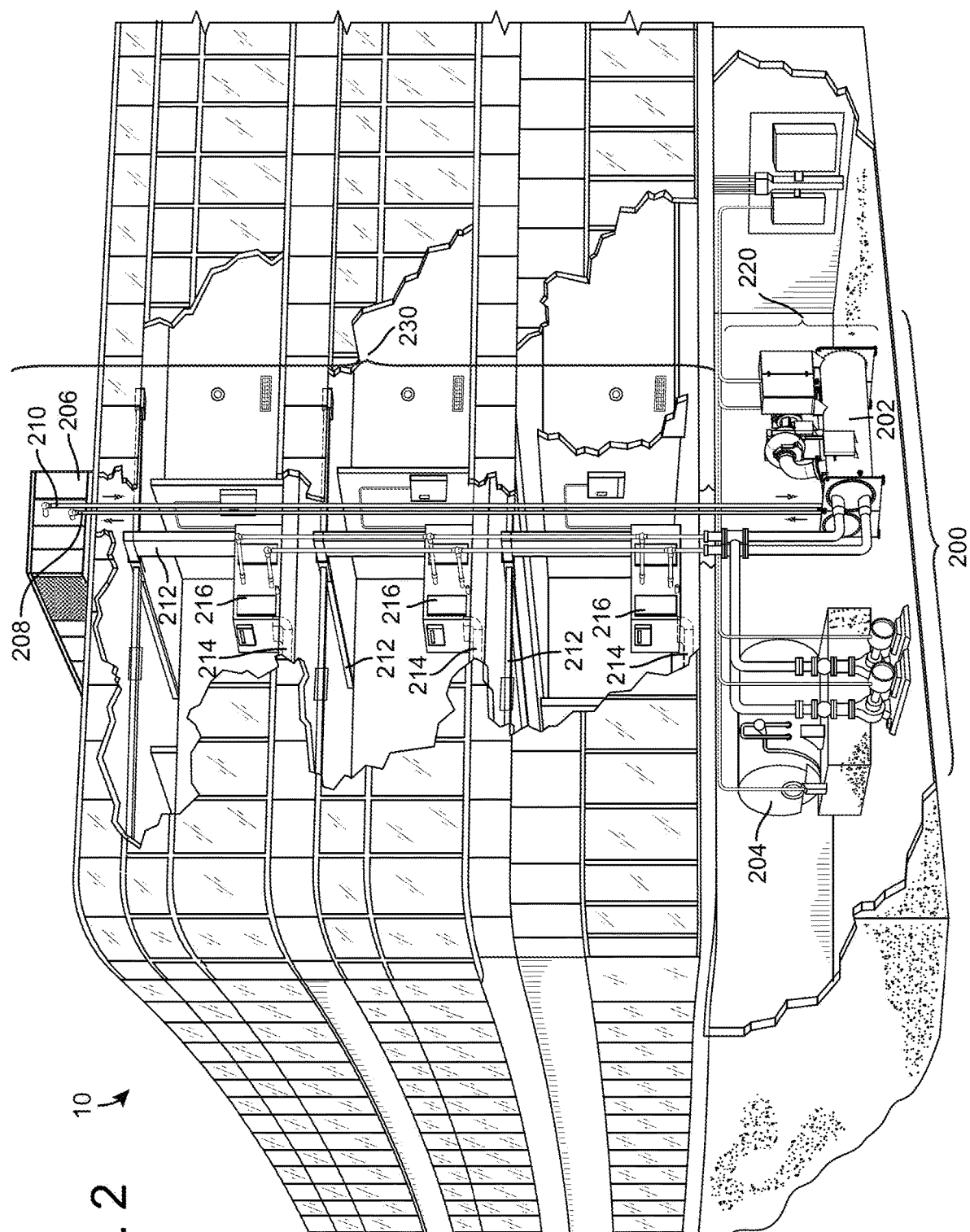
FIG. 2 is a perspective view of a building, according to an exemplary embodiment.
Figure 3:
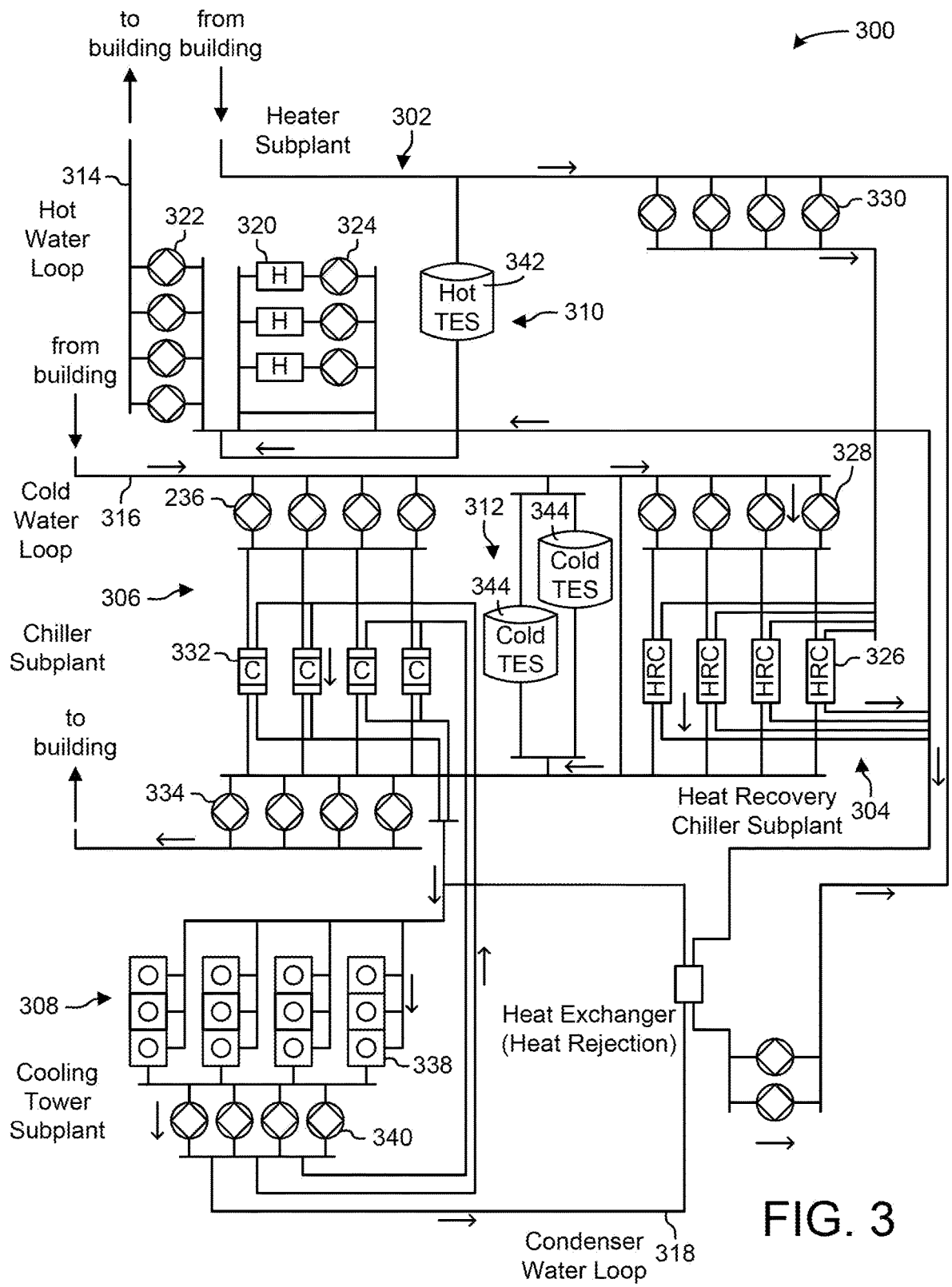
FIG. 3 is a block diagram of a waterside system, according to an exemplary embodiment.
Figure 4:
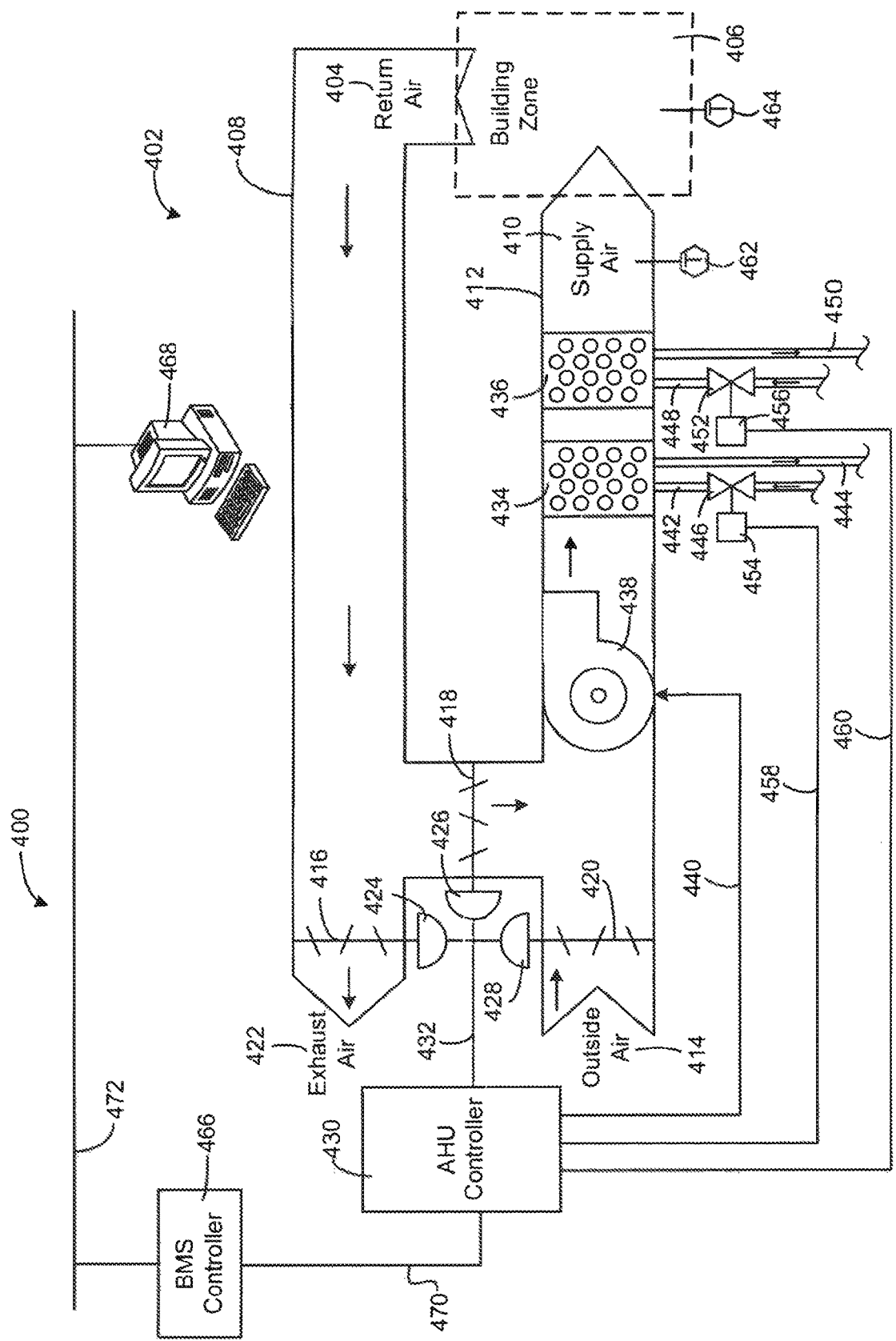
FIG. 4 is a block diagram of an airside system, according to an exemplary embodiment.
Figure 5:
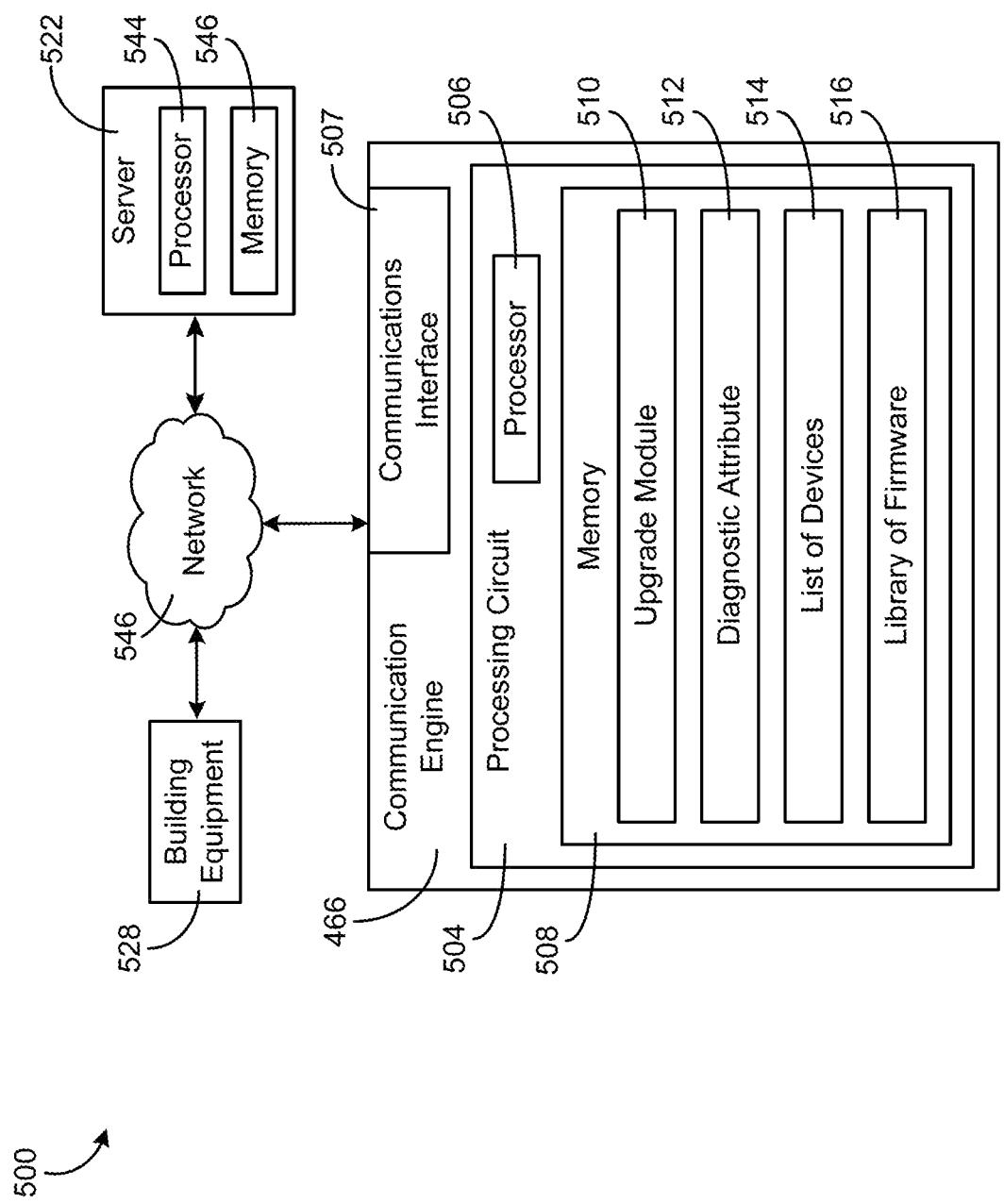
FIG. 5 is a block diagram of a building management system including a communication engine, according to an exemplary embodiment.

Referring now to FIGS. 2-5, several building management systems (BMS) and HVAC systems in which the systems and methods of the present disclosure can be implemented are shown, according to some embodiments. In brief overview, FIG. 2 shows a building 10 equipped with, for example, a HVAC system 200. Building 10 may be building 120 as shown in FIG. 1, or may be any other suitable building or structure that is communicatively connected to tier 1 device 102 or tier 2 device 104. FIG. 3 is a block diagram of a waterside system 300 which can be used to serve building 10. FIG. 4 is a block diagram of an airside system 400 which can be used to serve building 10. FIG. 5 is a block diagram of a building management system (BMS) which can be used to monitor and control building 10. The building 10 can include the network 103 or communicate with the network 103 and its components. Systems and methods of upgrading communication protocols and increasing network security can be used with the networks and equipment described with reference to FIGS. 2-5 in accordance with some exemplary embodiments. Tier 2 device 104 (FIG. 1) can be used in building 10 in some embodiments.

Building and HVAC System

Referring particularly to FIG. 2, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, and any other system that is capable of managing building functions or devices, or any combination thereof. Further, each of the systems may include sensors and other devices (e.g., IoT devices) for the proper operation, maintenance, monitoring, and the like of the respective systems.

The BMS that serves building 10 includes a HVAC system 200. HVAC system 200 can include HVAC devices (e.g., heaters, chillers, air handling units, pumps, fans, thermal energy storage, etc.) configured to provide heating, cooling, ventilation, or other services for building 10. For example, HVAC system 200 is shown to include a waterside system 220 and an airside system 230. Waterside system 220 may provide a heated or chilled fluid to an air handling unit of airside system 230. Airside system 230 may use the heated or chilled fluid to heat or cool an airflow provided to building 10. An exemplary waterside system and airside system which can be used in HVAC system 200 are described in greater detail with reference to FIGS. 3 and 4.

HVAC system 200 is shown to include a chiller 202, a boiler 204, and a rooftop air handling unit (AHU) 206. Waterside system 220 may use boiler 204 and chiller 202 to heat or cool a working fluid (e.g., water, glycol, etc.) and may circulate the working fluid to AHU 206. In various embodiments, the HVAC devices of waterside system 220 can be located in or around building 10 (as shown in FIG. 2) or at an offsite location such as a central plant (e.g., a chiller plant, a steam plant, a heat plant, etc.). The working fluid can be heated in boiler 204 or cooled in chiller 202, depending on whether heating or cooling is required in building 10. Boiler 204 may add heat to the circulated fluid, for example, by burning a combustible material (e.g., natural gas) or using an electric heating element. Chiller 202 may place the circulated fluid in a heat exchange relationship with another fluid (e.g., a refrigerant) in a heat exchanger (e.g., an evaporator) to absorb heat from the circulated fluid.

The working fluid from chiller 202 and/or boiler 204 can be transported to AHU 206 via piping 208.

AHU 206 may place the working fluid in a heat exchange relationship with an airflow passing through AHU 206 (e.g., via one or more stages of cooling coils and/or heating coils). The airflow can be, for example, outside air, return air from within building 10, or a combination of both. AHU 206 may transfer heat between the airflow and the working fluid to provide heating or cooling for the airflow. For example, AHU 206 can include one or more fans or blowers configured to pass the airflow over or through a heat exchanger containing the working fluid. The working fluid may then return to chiller 202 or boiler 204 via piping 210.

Airside system 230 may deliver the airflow supplied by AHU 206 (i.e., the supply airflow) to building 10 via air supply ducts 212 and may provide return air from building 10 to AHU 206 via air return ducts 214. In some embodiments, airside system 230 includes multiple variable air volume (VAV) units 216. For example, airside system 230 is shown to include a separate VAV unit 216 on each floor or zone of building 10. VAV units 216 can include dampers or other flow control elements that can be operated to control an amount of the supply airflow provided to individual zones of building 10. In other embodiments, airside system 230 delivers the supply airflow into one or more zones of building 10 (e.g., via supply ducts 212) without using intermediate VAV units 216 or other flow control elements. AHU 206 can include various sensors (e.g., temperature sensors, pressure sensors, etc.) configured to measure attributes of the supply airflow. AHU 206 may receive input from sensors located within AHU 206 and/or within the building zone and may adjust the flow rate, temperature, or other attributes of the supply airflow through AHU 206 to achieve setpoint conditions for the building zone.

Waterside System

Referring now to FIG. 3, a block diagram of a waterside system 300 is shown, according to some embodiments. In various embodiments, waterside system 300 may supplement or replace waterside system 220 in HVAC system 200 or can be implemented separate from HVAC system 200. When implemented in HVAC system 200, waterside system 300 can include a subset of the HVAC devices in HVAC system 200 (e.g., boiler 204, chiller 202, pumps, valves, etc.) and may operate to supply a heated or chilled fluid to AHU 206. The HVAC devices of waterside system 300 can be located within building 10 (e.g., as components of waterside system 220) or at an offsite location such as a central plant.

In FIG. 3, waterside system 300 is shown as a central plant having subplants 302-312. Subplants 302-312 are shown to include a heater subplant 302, a heat recovery chiller subplant 304, a chiller subplant 306, a cooling tower subplant 308, a hot thermal energy storage (TES) subplant 310, and a cold thermal energy storage (TES) subplant 312. Subplants 302-312 consume resources (e.g., water, natural gas, electricity, etc.) from utilities to serve thermal energy loads (e.g., hot water, cold water, heating, cooling, etc.) of a building or campus. For example, heater subplant 302 can be configured to heat water in a hot water loop 314 that circulates the hot water between heater subplant 302 and building 10. Chiller subplant 306 can be configured to chill water in a cold water loop 316 that circulates the cold water between chiller subplant 306 and building 10. Heat recovery chiller subplant 304 can be configured to transfer heat from cold water loop 316 to hot water loop 314 to provide additional heating for the hot water and additional cooling for the cold water. Condenser water loop 318 may absorb heat from the cold water in chiller subplant 306 and reject the absorbed heat in cooling tower subplant 308 or transfer the absorbed heat to hot water loop 314. Hot TES subplant 310 and cold TES subplant 312 may store hot and cold thermal energy, respectively, for subsequent use.

Hot water loop 314 and cold water loop 316 may deliver the heated and/or chilled water to air handlers located on the rooftop of building 10 (e.g., AHU 206) or to individual floors or zones of building 10 (e.g., VAV units 216). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 302-312 to receive further heating or cooling.

Although subplants 302-312 are shown and described as heating and cooling water for circulation to a building, it is understood that any other type of working fluid (e.g., glycol, CO2, etc.) can be used in place of or in addition to water to serve thermal energy loads. In other embodiments, subplants 302-312 may provide heating and/or cooling directly to the building or campus without requiring an intermediate heat transfer fluid. These and other variations to waterside system 300 are within the teachings of the present disclosure.

Each of subplants 302-312 can include a variety of equipment configured to facilitate the functions of the subplant. For example, heater subplant 302 is shown to include heating elements 320 (e.g., boilers, electric heaters, etc.) configured to add heat to the hot water in hot water loop 314. Heater subplant 302 is also shown to include several pumps 322 and 324 configured to circulate the hot water in hot water loop 314 and to control the flow rate of the hot water through individual heating elements 320. Chiller subplant 306 is shown to include chillers 332 configured to remove heat from the cold water in cold water loop 316. Chiller subplant 306 is also shown to include several pumps 334 and 336 configured to circulate the cold water in cold water loop 316 and to control the flow rate of the cold water through individual chillers 332.

Heat recovery chiller subplant 304 is shown to include heat recovery heat exchangers 326 (e.g., refrigeration circuits) configured to transfer heat from cold water loop 316 to hot water loop 314. Heat recovery chiller subplant 304 is also shown to include several pumps 328 and 330 configured to circulate the hot water and/or cold water through heat recovery heat exchangers 326 and to control the flow rate of the water through individual heat recovery heat exchangers 326. Cooling tower subplant 308 is shown to include cooling towers 338 configured to remove heat from the condenser water in condenser water loop 318. Cooling tower subplant 308 is also shown to include several pumps 340 configured to circulate the condenser water in condenser water loop 318 and to control the flow rate of the condenser water through individual cooling towers 338.

Hot TES subplant 310 is shown to include a hot TES tank 342 configured to store the hot water for later use. Hot TES subplant 310 may also include one or more pumps or valves configured to control the flow rate of the hot water into or out of hot TES tank 342. Cold TES subplant 312 is shown to include cold TES tanks 344 configured to store the cold water for later use. Cold TES subplant 312 may also include one or more pumps or valves configured to control the flow rate of the cold water into or out of cold TES tanks 344.

In some embodiments, one or more of the pumps in waterside system 300 (e.g., pumps 322, 324, 328, 330, 334, 336, and/or 340) or pipelines in waterside system 300 include an isolation valve associated therewith. Isolation valves can be integrated with the pumps or positioned upstream or downstream of the pumps to control the fluid flows in waterside system 300. In various embodiments, waterside system 300 can include more, fewer, or different types of devices and/or subplants based on the particular configuration of waterside system 300 and the types of loads served by waterside system 300.

Airside System

Referring now to FIG. 4, a block diagram of an airside system 400 is shown, according to some embodiments. In various embodiments, airside system 400 may supplement or replace airside system 230 in HVAC system 200 or can be implemented separate from HVAC system 200. When implemented in HVAC system 200, airside system 400 can include a subset of the HVAC devices in HVAC system 200 (e.g., AHU 206, VAV units 216, ducts 212-214, fans, dampers, etc.) and can be located in or around building 10. Airside system 400 may operate to heat or cool an airflow provided to building 10 using a heated or chilled fluid provided by waterside system 300.

In FIG. 4, airside system 400 is shown to include an economizer-type air handling unit (AHU) 402. Economizer-type AHUs vary the amount of outside air and return air used by the air handling unit for heating or cooling. For example, AHU 402 may receive return air 404 from building zone 406 via return air duct 408 and may deliver supply air 410 to building zone 406 via supply air duct 412. In some embodiments, AHU 402 is a rooftop unit located on the roof of building 10 (e.g., AHU 206 as shown in FIG. 2) or otherwise positioned to receive both return air 404 and outside air 414. AHU 402 can be configured to operate exhaust air damper 416, mixing damper 418, and outside air damper 420 to control an amount of outside air 414 and return air 404 that combine to form supply air 410. Any return air 404 that does not pass through mixing damper 418 can be exhausted from AHU 402 through exhaust damper 416 as exhaust air 422.

Each of dampers 416-420 can be operated by an actuator. For example, exhaust air damper 416 can be operated by actuator 424, mixing damper 418 can be operated by actuator 426, and outside air damper 420 can be operated by actuator 428. Actuators 424-428 may communicate with an AHU controller 430 via a communications link 432. Actuators 424-428 may receive control signals from AHU controller 430 and may provide feedback signals to AHU controller 430. Feedback signals can include, for example, an indication of a current actuator or damper position, an amount of torque or force exerted by the actuator, diagnostic information (e.g., results of diagnostic tests performed by actuators 424-428), status information, commissioning information, configuration settings, calibration data, and/or other types of information or data that can be collected, stored, or used by actuators 424-428. AHU controller 430 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 424-428.

Still referring to FIG. 4, AHU 304 is shown to include a cooling coil 434, a heating coil 436, and a fan 438 positioned within supply air duct 412. Fan 438 can be configured to force supply air 410 through cooling coil 434 and/or heating coil 436 and provide supply air 410 to building zone 406. AHU controller 430 may communicate with fan 438 via communications link 440 to control a flow rate of supply air 410. In some embodiments, AHU controller 430 controls an amount of heating or cooling applied to supply air 410 by modulating a speed of fan 438.

Cooling coil 434 may receive a chilled fluid from waterside system 300 (e.g., from cold water loop 316) via piping 442 and may return the chilled fluid to waterside system 300 via piping 444. Valve 446 can be positioned along piping 442 or piping 444 to control a flow rate of the chilled fluid through cooling coil 434. In some embodiments, cooling coil 434 includes multiple stages of cooling coils that can be independently activated and deactivated (e.g., by AHU controller 430, by BMS controller 466, etc.) to modulate an amount of cooling applied to supply air 410.

Heating coil 436 may receive a heated fluid from waterside system 300 (e.g., from hot water loop 314) via piping 448 and may return the heated fluid to waterside system 300 via piping 450. Valve 452 can be positioned along piping 448 or piping 450 to control a flow rate of the heated fluid through heating coil 436. In some embodiments, heating coil 436 includes multiple stages of heating coils that can be independently activated and deactivated (e.g., by AHU controller 430, by BMS controller 466, etc.) to modulate an amount of heating applied to supply air 410.

Each of valves 446 and 452 can be controlled by an actuator. For example, valve 446 can be controlled by actuator 454 and valve 452 can be controlled by actuator 456. Actuators 454-456 may communicate with AHU controller 430 via communications links 458-460. Actuators 454-456 may receive control signals from AHU controller 430 and may provide feedback signals to controller 430. In some embodiments, AHU controller 430 receives a measurement of the supply air temperature from a temperature sensor 462 positioned in supply air duct 412 (e.g., downstream of cooling coil 434 and/or heating coil 436). AHU controller 430 may also receive a measurement of the temperature of building zone 406 from a temperature sensor 464 located in building zone 406.

In some embodiments, AHU controller 430 operates valves 446 and 452 via actuators 454-456 to modulate an amount of heating or cooling provided to supply air 410 (e.g., to achieve a setpoint temperature for supply air 410 or to maintain the temperature of supply air 410 within a setpoint temperature range). The positions of valves 446 and 452 affect the amount of heating or cooling provided to supply air 410 by cooling coil 434 or heating coil 436 and may correlate with the amount of energy consumed to achieve a desired supply air temperature. AHU controller 430 may control the temperature of supply air 410 and/or building zone 406 by activating or deactivating coils 434-436, adjusting a speed of fan 438, or a combination of both.

Still referring to FIG. 4, airside system 400 is shown to include a building management system (BMS) controller 466 and a client device 468. Communication engine 466 can include one or more computer systems (e.g., servers, supervisory controllers, subsystem controllers, etc.) that serve as system level controllers, application or data servers, head nodes, or master controllers for airside system 400, waterside system 300, HVAC system 200, and/or other controllable systems that serve building 10. Communication engine 466 may communicate with multiple downstream building systems or subsystems (e.g., HVAC system 200, a security system, a lighting system, waterside system 300, etc.) via a communications link 470 according to like or disparate protocols (e.g., LON, BACnet, etc.). In various embodiments, AHU controller 430 and Communication engine 466 can be separate (as shown in FIG. 4) or integrated. In an integrated implementation, AHU controller 430 can be a software module configured for execution by a processor of BMS controller 466.

In some embodiments, AHU controller 430 receives information from Communication engine 466 (e.g., commands, setpoints, operating boundaries, etc.) and provides information to Communication engine 466 (e.g., temperature measurements, valve or actuator positions, operating statuses, diagnostics, etc.). For example, AHU controller 430 may provide Communication engine 466 with temperature measurements from temperature sensors 462-464, equipment on/off states, equipment operating capacities, and/or any other information that can be used by Communication engine 466 to monitor or control a variable state or condition within building zone 406.

Client device 468 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 200, its subsystems, and/or devices. Client device 468 can be a computer workstation, a client terminal, a remote or local interface, or any other type of user interface device. Client device 468 can be a stationary terminal or a mobile device. For example, client device 468 can be a desktop computer, a computer server with a user interface, a laptop computer, a tablet, a smartphone, a PDA, or any other type of mobile or non-mobile device. Client device 468 may communicate with Communication engine 466 and/or AHU controller 430 via communications link 472.

Building Management System

Referring now to FIG. 5, a block diagram of a building management system (BMS) 500 can be implemented in building 10 or building 120 to automatically monitor and control various building functions. BMS 500 includes a communication engine 466 (e.g., a tier 2 device) in communication with a network 546 including one or more building subsystems including building equipment 528. Building subsystems can include a building electrical subsystem, an information communication technology (ICT) subsystem, a security subsystem, a HVAC subsystem, a lighting subsystem, a lift/escalators subsystem, and a fire safety subsystem. In various embodiments, building subsystems can include fewer, additional, or alternative subsystems. For example, building subsystems may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems include waterside system 300 and/or airside system 400, as described with reference to FIGS. 3-4.

Each of building subsystems can include any number of devices (e.g., building equipment 528), such as, sensors, controllers, and connections for completing its individual functions and control activities. The building equipment 528 can include many of the same components as HVAC system 200, as described with reference to FIGS. 2-4. For example, building equipment 528 can include a chiller, a boiler, any number of air handling units, economizers, field controllers, supervisory controllers, actuators, temperature sensors, and other devices for controlling the temperature, humidity, airflow, or other variable conditions within building 10. Building equipment 528 can also include any number of light fixtures, ballasts, lighting sensors, dimmers, or other devices configured to controllably adjust the amount of light provided to a building space. Building equipment 528 can also include occupancy sensors, video surveillance cameras, digital video recorders, video processing servers, intrusion detection devices, access control devices and servers, or other security-related devices.

Communication engine 466 includes a communications interface 507 for communicating with network 546 which is coupled to server 522 (e.g., a tier 1 device). Communication engine 466 translates communications (e.g., sensor data, input signals, output signals, etc.) across multi-vendor/multi-protocol systems. Interface 507 can be or include wired or wireless communications interfaces (e.g., jacks, antennas, transmitters, receivers, transceivers, wire terminals, etc.) for conducting data communications with building equipment 528 or server 522. In various embodiments, communications via interface 507 can be direct (e.g., local wired or wireless communications) or via more than one network (e.g., a WAN, the Internet, a cellular network, etc.). For example, interface 507 can include an Ethernet card and port for sending and receiving data via an Ethernet-based communications link or network. In another example, interface 507 can include a Wi-Fi transceiver for communicating via a wireless communications network. In another example, interface 507 is capable of communicating using BACnet/SC and BACnet/IP protocols.

Communication engine 466 includes a processing circuit 504 including a processor 506 and memory 508 in some embodiment. Processing circuit 504 can be communicably connected to communications interface 507 such that processing circuit 504 and the various components thereof can send and receive data via interface 507. Processor 506 can be implemented as a general purpose processor, an application specific integrated circuit (ASIC), one or more field programmable gate arrays (FPGAs), a group of processing components, or other suitable electronic processing components.

Memory 508 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 508 can be or include volatile memory or non-volatile memory. Memory 508 can include database components, object code components, script components, or any other type of information structure for supporting the various activities and information structures described in the present application. According to some embodiments, memory 508 is communicably connected to processor 506 via processing circuit 504 and includes computer code for executing (e.g., by processing circuit 504 and/or processor 506) one or more processes or operations as described herein. In some embodiments, server 522 includes a processor 544 and memory 546 similar to the processor 506 and memory 508 described above In some embodiments, communication engine 466 is implemented within a single computer (e.g., one server, one housing, etc.). In various other embodiments, communication engine 466 can be distributed across multiple servers or computers (e.g., that can exist in distributed locations).

Memory 508 includes an upgrade module 510, a diagnostic attribute 512, a list of devices 514 on the network 546 (e.g., a mapping of devices), and a firmware library 516. Processing circuit 504 can be configured to receive inputs and monitor communications from and between building equipment 528 and other data sources. Processing circuit 504 can use upgrade module 510 to determine building equipment 528 on the list of devices 514 requiring an upgrade to a higher level security protocol. Upgrade module can provide firmware for each particular device of the building equipment 528 from the firmware library 516. Firmware library 516 stores firmware for the various building equipment including upgraded communication protocols, legacy communication protocols and both upgraded and legacy communication protocols in some embodiments.

Communication engine 466 is configured to provide one or more communication graphic user interfaces (GUIs) for configuring communications (including upgrading building equipment 528) on the network 546. The GUIs can provide and display lists of building equipment 528 requiring an upgrade, lists of building equipment 528 that communicate with other building equipment using a lower security protocol, lists of diagnostic attribute information, lists of building equipment 528 that have security vulnerability, and lists of building equipment 528 and their associated protocol level. In some embodiments, an operator can choose building equipment 528 for upgrades based on one or more of the lists. Communication engine 466 advantageously uses the operations associated with the memory 508 to identify areas of the network for increased security and to improve and/or optimize security on the network in some embodiments.

Diagnostic attribute 512 stores communication information about each piece of building equipment 528 (e.g., controller). In some embodiments, the diagnostic attribute shows a list of all devices accessing data from the communication engine 466 over BACnet/IP and is an array of structures with each structure consisting parameters such as those discussed below. The diagnostic attribute 512 stores an IP address, a BACnet device object identifier, a BACnet service, and a time stamp for each communication and tracks whether the communication is with building equipment 528 with a non-secure or less secure protocol. This information can be used to identify building equipment 528 requiring an upgrade or building equipment 528 that is communicating with less secure building equipment 528. Each piece of building equipment 528 can also include a diagnostic attribute tracking communications of that piece of building equipment 528 in some embodiments. Communication engine 466 can read the diagnostic attribute of building equipment 528 and the diagnostic attribute 512 of other communication engines.

In some embodiments, if the diagnostic attribute 512 indicates that devices have not been communicating with other non-secure devices for a period of time (e.g., an hour, day, etc.), the device may be considered secure. In some embodiments, the diagnostic attribute 512 may include flags from building databases, central databases or systems (e.g., a Metasys® system) which indicate the security protocol of each device in the network 546. The flags may be a whitelist, or a blacklist of devices or device types that are permitted or not permitted to be insecure or use lower level security. Any device that is not already flagged, would be added when a new IP address or new device ID appears and that device is not using the higher security protocol. In some embodiments, the diagnostic attribute 512 is a table of communication information viewable to a user. The communication information can include IP address of a communication request, BACnet device object identifier, net read ID of an access point, BACnet service (e.g., change of value, redirect, notification, etc.) and time stamps of the last communication. In some embodiments, the diagnostic attribute only lists communications using the lower security level (e.g., incoming information on BACnet/IP).

Communications monitored by the communication engine 466 can be classified into the following categories: 1. Peer references between single party devices; 2. BACnet/IP integration; 3. SC to IP router; and 4. Third party BACnet/IP devices communicating with another party's devices. Communication engine 466 advantageously provides protocol upgrades for the four communication classifications above and/or accommodates legacy devices for the four communication classifications above in some embodiments.

Peer references generally refer to a communications where Device A may have an input point whose value source is on a different Device B and utilize BACnet protocols. (Outdoor air temperature is a value used from another source used in the control of many pieces of building equipment 528). The input point on Device A contains a peer reference telling the firmware to obtain the value from Device B. Device A subscribes for change of value notifications on the point in Device B. Device B notifies Device A of any changes in the value that exceeds a specified threshold.

Integrations refers to the ability to discover devices and map points into communication engine 466. BACnet/IP integrations refer to an integration to map points from the building equipment (e.g., a controller) that communicates over BACnet/IP. For example, if communication engine 466 contains a BACnet/IP integration, communication engine 466 retains BACnet/IP communications if it is upgraded to support BACnet/SC.

A BACnet/SC to BACnet/IP router refers to the case where a site may choose to keep all BACnet/IP devices on a separate BACnet/IP network than the SC devices. In some embodiments, one device will serve as the BACnet/SC to BACnet/IP router and communication engine 466 may serve that purpose. Both BACnet/SC and BACnet/IP communications are maintained on the communication engine 466 to fulfill its duties as a router between the two protocols.

In some embodiments, not all devices can be upgraded such as third party devices. In some embodiments, the upgrade module 510 provides that all other devices that interface to the non-upgraded devices retain some lower security protocol functionality (e.g., BACnet/IP) even if they are upgrading to firmware that supports the higher security protocol (e.g., BACnet/SC). The communication engine 466 can use system tools or list of devices 514 to identify devices that will not be upgraded and system tools or diagnostic attribute 512 to identify devices that communicate with the devices that will not be upgraded.

In some embodiments, the communication engine 466 performs the following operations for a migration from one communication to another communication protocol (e.g., BACnet/IP to BACnet/SC:
1. Identify all devices to be upgraded to the upgrade protocol (e.g., BACnet/SC)
2. Perform the upgrade process. Update the firmware with the upgrade protocol (e.g., BACnet/SC) enabled, but leave the original protocol (e.g., BACnet/IP) enabled as well even if that protocol is not the desired final state for the device.
3. When this process is complete for each identified device, the diagnostic attribute in each upgraded device is examined to determine if there are any original protocol (e.g., BACnet/IP) communications to or from this device to another device on the network 546. This other device can be evaluated for its upgrade potential to SC or the communication engine 466 remains with both BACnet/SC and BACnet/IP enabled.

In some embodiments, the diagnostic attribute 512 is a list that can show the following information in an array of structures, each structure including:
IP address
BACnet Device Object Identifier
BACnet Object Identifier and Attribute ID of the accessed point
BACnet Service (change of value notification, read/write property, event notification)
Timestamp of last communication The list can include less or more information in some embodiments. In addition, the diagnostic attribute 512 is not only a valuable diagnostic during the upgrade process, diagnostic attribute 512 serves as an indicator of insecure communications within the BMS 500 to highlight potential vulnerabilities and possible future upgrade work.

Figure 6:
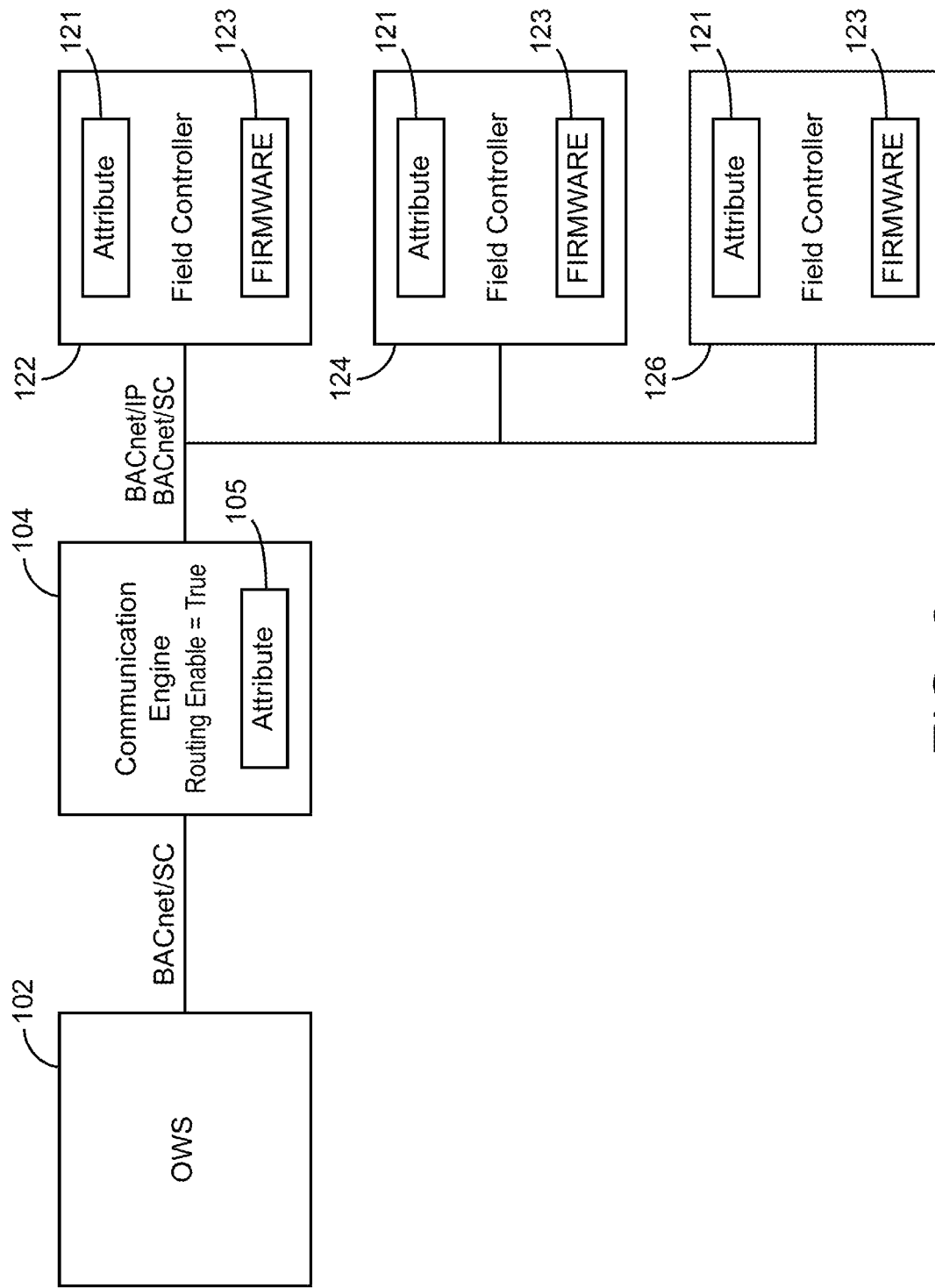
FIG. 6 is a block diagram of a communication system communicating with HVAC devices in a building automation network, according to an exemplary embodiment.

With reference to FIG. 6, tier I device 102 and tier 2 device 104 communicate via a BACnet/SC protocol according to one embodiment. Tier 1 device 102 is a server embodied as an operator work station (OW S) in some embodiments. Tier 2 device 104 can include communication engine 466 (FIG. 5) and communicates with tier 3 devices 122, 124, and 126 via a BACnet/IP or BACnet/SC protocol. Tier 2 device 104 includes a diagnostic attribute 105 and Tier 3 devices 122, 124, and 126 include diagnostic attributes 121 and firmware 123. Tier 1 device 102 also include a diagnostic attribute in some embodiments. Tier 2 device 104 upgrades the firmware 123 of Tier 3 devices 122, 124, and 126 for BACnet/SC communications where appropriate in some embodiments.

Figure 7:
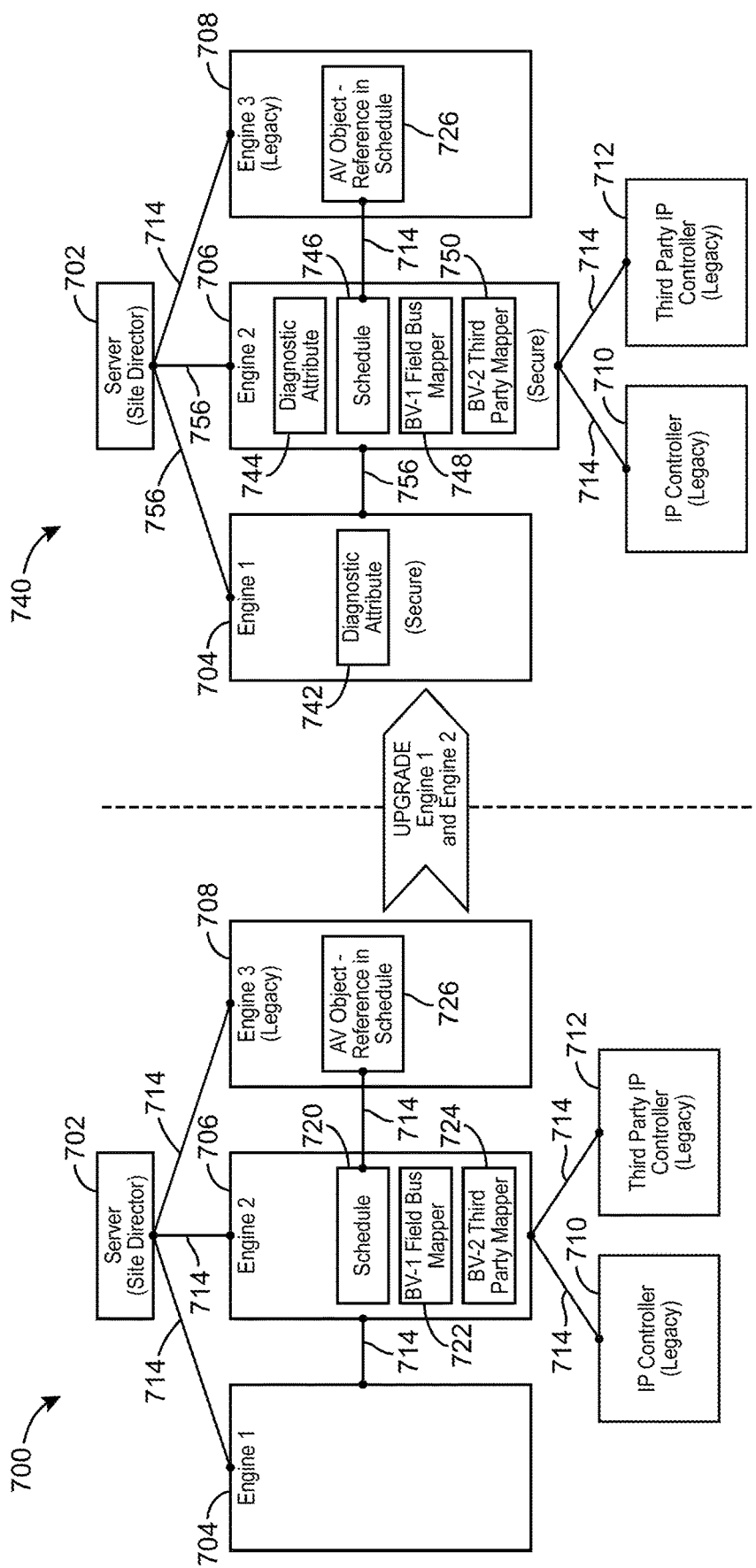
FIG. 7 is a block diagram showing an upgrade of communication engines in a building automation network.

With reference to FIG. 7, network 700 includes a tier 1 device 702 (e.g., a service director), a tier 2 devices 704, 706, and 708 (e.g., engines 1, 2 and 3), and controllers 710 and 712. Tier 1 device 702, a tier 2 devices 704, 706, and 708, and controllers 710 and 712 communicate via BACnet/IP protocol 714. Controller 710 is part of the system associated with tier 2 devices 704, 706, and 708 and mapped in field mapper 722. Controller 710 is a third party system and is mapped via a third party mapper 724. Tier 2 device 706 includes a schedule 720 that references an AV object 726 in tier 2 device 708.

In some embodiments, network 700 is upgraded to network 740 so that tier 2 devices 704 and 706 communicate via the BACnet/SC protocol 756, and tier 2 devices 704 and 706 communicate with tier 1 device 702 via the BACnet/SC protocol 756. Communications between tier 2 devices 706 and 708 are via the BACnet/IP protocol 714 due the AV object 726. Communications between tier 2 devices 704 and 706 are via the BACnet/IP protocol 714. Mappers 722 and 724 provide indications of which controllers 710 and 712 can be upgraded.

If controllers 710 and 712 are capable of being upgraded to BACnet/SC and do not communicate with other devices that use BACnet/IP, tier 2 device can be upgraded to use BACnet/SC to communicate with controllers 710 and 712. Tier 2 devices 704 and 706 include diagnostic attributes 742 and 744 for use during the upgrade process and for use as an indicator of insecure communications within the network 740 to highlight potential vulnerabilities and possible future upgrade work. Diagnostic attributes 742 and 744 are added when Tier 2 devices 704 and 706 are upgraded for the higher security level communication protocol in some embodiments.

An exemplary method 800 for upgrading a network to a higher security protocol is described below with reference to FIG. 8. Method 800 can be used by communication engine 466, tier 2 devices 704, 706, and 104, tier 1 device 102 and tier 1 device 702. The operations of the method 800 described with reference to FIG. 8 may be performed by or via the networks, devices, components and elements described above. However, the method 800 is not specifically limited to use with these networks, devices, components, and elements.

Figure 8:
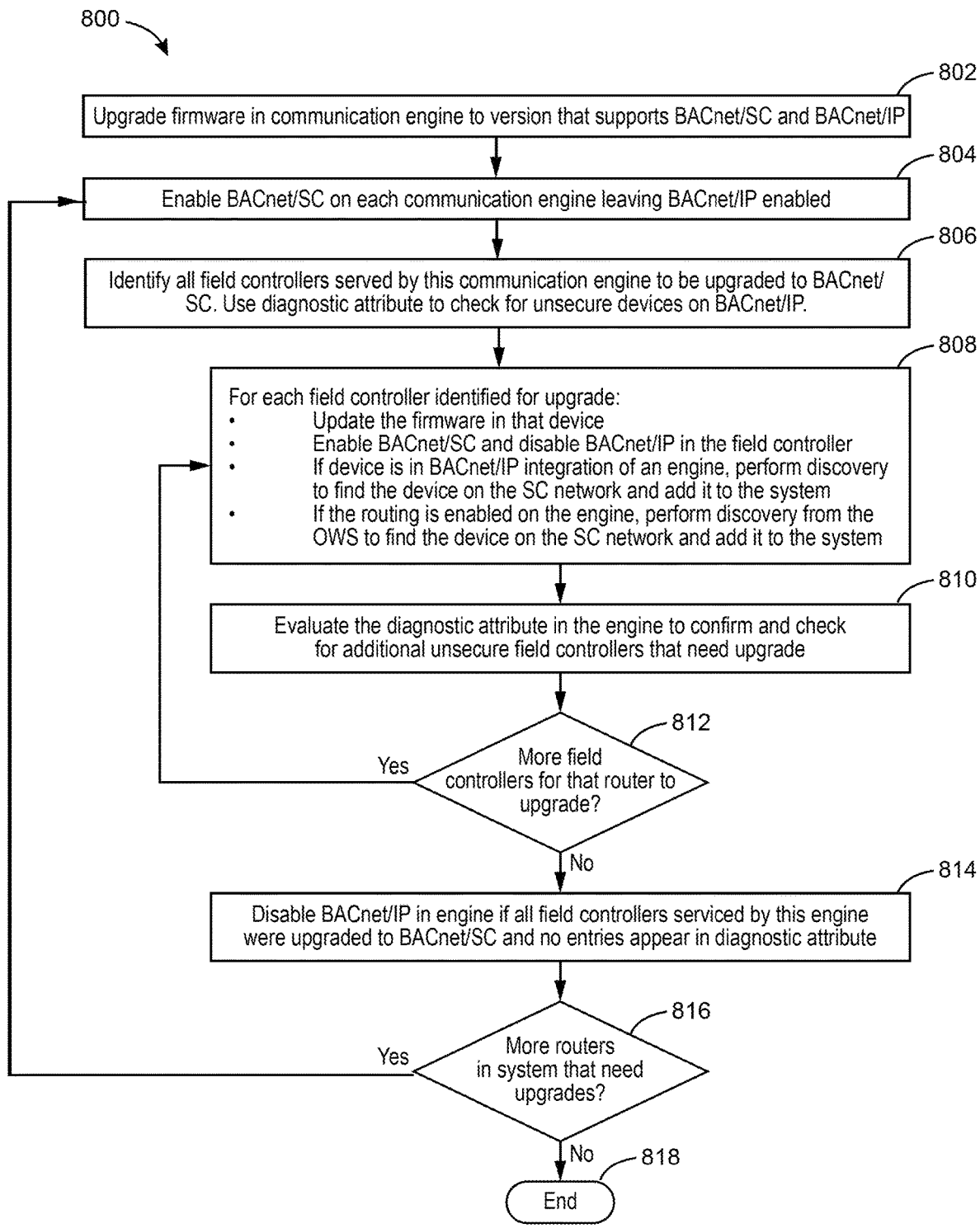
FIG. 8 is a flow diagram showing a method of upgrading a network protocol to enhance network security in a building, according to an exemplary embodiment.

With reference to FIGS. 5 and 8, at an operation 802, communication engine 466 receives upgraded firmware for a higher security protocol. The firmware supports BACnet/SC and BACnet/IP protocols in some embodiments. In some embodiments, the communication engine 466 is employed with the firmware of operation 802 and does not require reception of the firmware.

At an operation 804, BACnet/SC protocol is enabled on the communication engine 466 (e.g., router). In some embodiments, the BACnet/IP protocol is left enabled. At an operation 806, the communication engine 466 identifies all building equipment 528 (e.g., controllers) served by the communication engine 466 that is to be upgraded to BACnet/SC. The diagnostic attribute 512 is used to check for unsecure building equipment 528 using BACnet/IP.

At an operation 808, for each building equipment 528 identified for an upgrade, the firmware in that device is upgraded, the BACnet/SC protocol is enabled and the BACnet/IP protocol is disabled in some embodiments. If the piece of building equipment 528 is in a BACnet integration of the communication engine 466, discovery is performed to find the piece of building equipment 528 on the network 546 in the BACnet/SC protocol and added to the system. If routing is enabled in the communication engine 466, discovery from the server 522 embodied as an OWS is performed to find the device on the BACnet/SC network and added to the system.

At an operation 810, the diagnostic attribute 512 is evaluated in the communication engine 466 to confirm and check for additional unsecure building equipment (e.g., field controllers) that need an upgrade. At an operation 812, if more building equipment 528 require an upgrade, the method 800 returns to operation 808. At the operation 812, if more building equipment 528 does not require an upgrade, the method 800 proceeds to operation 814.

At an operation 814, BACnet/IP is disabled in the communication engine 466 if all building equipment 528 serviced by the communication engine 466 were upgraded to BACnet/SC and no BACnet/IP entries appear in the diagnostic attribute 512. At an operation 816, if more communication engines 466 require an upgrade, the method 800 returns to operation 804. At the operation 816, if more communication engines 466 do not require an upgrade, the method 800 proceeds to operation 818 and ends.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc.) by which the user may provide input to the computer. Other kinds of devices may be used to provide for interaction with a user as well; for example, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

The present disclosure may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, features or aspects within each example embodiment should typically be considered as available for other similar features or aspects in other example embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A building system, comprising:
a plurality of heating ventilation or air conditioning (HVAC) devices configured for communication on a building automation network; and
a communication engine configured to provide a diagnostic attribute and to communicate using a first communication protocol, the diagnostic attribute indicating electronic communications with the HVAC devices as being according to at least one different communication protocol from the first communication protocol,
wherein the communication engine is configured as a server comprising a processing circuit, the processing circuit comprising a processor and memory, the memory storing instructions that, when executed by the processor, cause the processor to perform operations, the operations comprising:
monitoring the electronic communications to determine the diagnostic attribute, the diagnostic attribute indicating certain electronic data communications with the HVAC devices as being according to the at least one different communication protocol from the first communication protocol;
using the diagnostic attribute to determine first HVAC devices of the HVAC devices to be updated to the first communication protocol;
updating a firmware of the first HVAC devices served by the communication engine to be updated to the first communication protocol using an update module, the firmware comprising the at least one different communication protocol and the first communication protocol after updating to the first communication protocol;
identifying at least one second HVAC device of the first HVAC devices that interfaces with other HVAC devices using the at least one different communication protocol; and
disabling the communication using the at least one different communication protocol by the first HVAC devices while allowing communication using the at least one different communication protocol by the at least one second HVAC device,
wherein the first HVAC devices comprise field controllers.

2. The building system of claim 1,
wherein the first communication protocol is a building automation and control network (BACnet) secure connect protocol and the at least one different communication protocol is a BACnet/IP protocol and
wherein the operations comprise enabling the first communication protocol for the first HVAC devices served by the communication engine to be updated.

3. The building system of claim 1, wherein the diagnostic attribute comprises an IP address, a BACnet device object identifier, a BACnet service, and a time stamp and a stored firmware upgrade is provided from a firmware library.

4. The building system of claim 1, wherein the memory stores the instructions that, when executed by the processor, cause the processor to perform further operations comprising:
  allowing the communication using the at least one different communication protocol by the HVAC devices after updating the firmware; and
  providing a list of the HVAC devices communicating using the at least one different communication protocol after updating the firmware.

5. The building system of claim 1, wherein the updating leaves the at least one different communication protocol enabled and the disabling is performed if the first HVAC devices and the communication engine do not use the at least one different communication protocol after updating firmware of the first HVAC devices.

6. The building system of claim 5, wherein any device communicating with an updated device via the different communication protocol is evaluated for an update after the disabling of the different communication protocol.

7. The building system of claim 1, further comprising:
  a tier 1 server in communication with the communication engine via the first communication protocol and
  wherein the diagnostic attribute comprises an IP address and a time stamp.

8. The building system of claim 1, wherein the HVAC devices comprise at least one of a chiller, boiler, air handling unit, or sensor.

9. The building system of claim 1, wherein the HVAC devices comprise Tier 2 devices.

10. A building system comprising:
  a plurality of heating ventilation or air conditioning (HVAC) devices configured for communication on a building automation network; and a communication engine, comprising:
    a processor configured to communicate with the HVAC devices using a first communication protocol and provide a diagnostic attribute, the diagnostic attribute listing communications with the HVAC devices as being according to at least one different communication protocol from the first communication protocol,
    wherein the communication engine is configured as a server and the processor is configured to:
      identify the HVAC devices served by the communication engine to be updated to the first communication protocol, the first communication protocol being a secure protocol; and
      wherein the processor is configured to update a firmware to the first communication protocol, the firmware being for the HVAC devices served by the communication engine to be updated using the diagnostic attribute and an update module, the update module being configured to provide a stored firmware version to update the firmware
    wherein the HVAC devices are field controllers using the diagnostic attribute to determine first HVAC devices of the HVAC devices that communicate using the at least one different communication protocol and are to be updated to the first communication protocol;
    wherein the processor is configured to identify at least one second HVAC device of the first HVAC devices that interfaces with other HVAC devices using the at least one different communication protocol, the first communication protocol being a more secure protocol,
    wherein the processor is configured to disable the communication using the at least one different communication protocol by the first HVAC devices while allowing the communication using the at least one different communication protocol by the at least one second HVAC device; and
    update the firmware of the HVAC devices served by the communication engine to be updated to the first communication protocol to the first communication protocol and disable the communication using the at least one different communication protocol by the HVAC devices.

11. The building system of claim 10, wherein the diagnostic attribute comprises flags from a building database or central computing system that indicates devices that are permitted to use the at least one different communication protocol.

12. A building system, comprising:
  a plurality of heating ventilation or air conditioning (HVAC) devices configured for communication on a building automation network; and
  a communication engine configured to provide a diagnostic attribute and to communicate using a first communication protocol, the diagnostic attribute indicating communications with the HVAC devices as being according to at least one different communication protocol from the first communication protocol,
  wherein the communication engine is configured as a server comprising a processing circuit, the processing circuit comprising a processor and memory, the memory storing instructions that, when executed by the processor, cause the processor to perform operations, the operations comprising:
    monitoring electronic communications to determine the diagnostic attribute, the diagnostic attribute indicating certain electronic data communications with the HVAC devices as being according to the at least one different communication protocol from the first communication protocol;
    using the diagnostic attribute to determine first HVAC devices of the HVAC devices that communicate using the at least one different communication protocol and are to be updated to the first communication protocol identifying the HVAC devices served by the communication engine to be updated to the first communication protocol, the first communication protocol being a more secure protocol;
    updating a firmware of the first HVAC devices served by the communication engine to be updated to the first communication protocol using an update module, the firmware comprising the at least one different communication protocol and the first communication protocol after updating to the first communication protocol;
    identifying at least one second HVAC device of the first HVAC devices that communicate using the at least one different communication protocol; and
    disabling the communication using the at least one different communication protocol by the first HVAC devices while allowing the communication using the at least one different communication protocol by the at least one second HVAC device; and
  a tier 1 server in communication with the communication engine via the first communication protocol.

13. The building system of claim 12,
wherein the diagnostic attribute comprises an IP address, a BACnet device object identifier, a BACnet service, and a time stamp,
wherein the diagnostic attribute indicates a particular device is one of the first HVAC devices when the particular device has not communicated using the different communication protocol for a period of time.

14. The building system of claim 12, wherein the memory stores the instructions that, when executed by the processor, cause the processor to perform further operations comprising:
allowing the communication using the at least one different communication protocol by the HVAC devices; and
providing a list of the HVAC devices communicating using the at least one different communication protocol after updating the firmware.

15. The building system of claim 12, wherein the memory stores the instructions that, when executed by the processor, cause the processor to perform a further operation comprising:
disabling the communications by the communication engine using the at least one different communication protocol if the communications between the HVAC devices and the communication engine do not use the at least one different communication protocol.

16. The building system of claim 12, wherein the HVAC devices are field controllers.

17. A method, the method comprising:
monitoring electronic communications in a building automation system network in a building system to determine a diagnostic attribute, the diagnostic attribute indicating certain electronic data communications with a plurality of heating ventilation or air conditioning (HVAC) devices as being according to at least one different communication protocol from a first communication protocol;
identifying the HVAC devices on the building automation system network to be updated to the first communication protocol from the at least one different communication protocol, the first communication protocol being a more secure protocol than the at least one different communication protocol; and
updating a firmware of the HVAC devices to be updated to the first communication protocol to the first communication protocol;
using the diagnostic attribute to determine first HVAC devices of the HVAC devices that communicate using the at least one different communication protocol and are to be updated to the first communication protocol;
identifying a second HVAC device of the first HVAC devices that interfaces with other HVAC devices that do not communicate using the first communication protocol or will not be updated to communicate using the first communication protocol, the first communication protocol being the more secure protocol and that interfaces with the other HVAC devices using the at least one different communication protocol; and
updating the firmware of the first HVAC devices to be updated to the first communication protocol using an update module, the firmware comprising the at least one different communication protocol and the first communication protocol after updating to the first communication protocol; and
disabling a communication using the at least one different communication protocol by the first HVAC devices that while allowing communication using the at least one different communication protocol by the second HVAC device.

18. The method of claim 17, wherein the HVAC devices are field controllers.

19. The method of claim 17, wherein the first communication protocol is a building automation and control network (BACnet) secure connect protocol and the at least one different communication protocol is a BACnet/IP protocol.

20. The method of claim 17, further comprising:
providing the diagnostic attribute comprising an IP address, a device, a protocol service, and a time stamp and using the diagnostic attribute to determine the HVAC devices that use the at least one different communication protocol,
wherein the diagnostic attribute is provided for viewing by a user.

21. The method of claim 17, further comprising:
providing a list of the HVAC devices communicating using the at least one different communication protocol after updating the firmware.

22. The method of claim 17, further comprising:
communicating with a tier 1 server in communication with a communication engine via the first communication protocol.

23. The method of claim 17, further comprising:
disabling communications by a communication engine using the at least one different communication protocol if the communications between the HVAC devices and the communication engine do not use the at least one different communication protocol after updating the firmware of the HVAC devices served by the communication engine.

24. A building system comprising:
a plurality of heating ventilation or air conditioning (HVAC) devices configured for communication on a building automation network, a communication engine; and
a processor configured to communicate with the HVAC devices using a first communication protocol and provide a diagnostic attribute, the diagnostic attribute listing communications with the HVAC devices as being according to at least one different communication protocol from the first communication protocol,
wherein the processor is configured to update to update a firmware to the first communication protocol, the firmware being for the HVAC devices served by the communication engine to be updated using the diagnostic attribute and an update module, the update module being configured to provide a stored firmware version to update the firmware
wherein the HVAC devices are field controllers using the diagnostic attribute to determine first HVAC devices of the HVAC devices that communicate using the at least one different communication protocol and are to be updated to the first communication protocol;
wherein the processor is configured to identify a second HVAC device of the first HVAC devices that interfaces with other HVAC devices using the at least one different communication protocol, the first communication protocol being a more secure protocol; and
wherein the processor is configured to disable a communication using the at least one different communication protocol by the first HVAC devices while allowing the communication using the at least one different communication protocol by the at least one second HVAC device.

25. The building system of claim 24, wherein the first communication protocol is a building automation and control network (BACnet) secure connect protocol and the at least one different communication protocol is a BACnet/IP protocol.

26. The building system of claim 24, wherein the processor is configured to disable communications by the communication engine using the at least one different communication protocol if the communications between the HVAC devices and the communication engine do not use the at least one different communication protocol after updating the firmware of the HVAC devices served by the communication engine.

27. The building system of claim 24, wherein the communication engine is configured as a server and the processor is configured to:
    identify the HVAC devices served by the communication engine to be updated to the first communication protocol, the first communication protocol being the secure protocol.

28. The building system of claim 24, wherein the communication engine is configured as a server.

29. The building system of claim 24, wherein the HVAC devices are the field controllers.

30. The building system of claim 24, wherein the HVAC devices comprise at least one of a chiller, boiler, air handling unit, or sensor.

* * * * *